Oct. 17, 1967  C. E. GREGORY  3,347,525
HYDROSTATIC ENGINE AND SHEAVE ASSEMBLY
Filed May 31, 1966  14 Sheets-Sheet 1

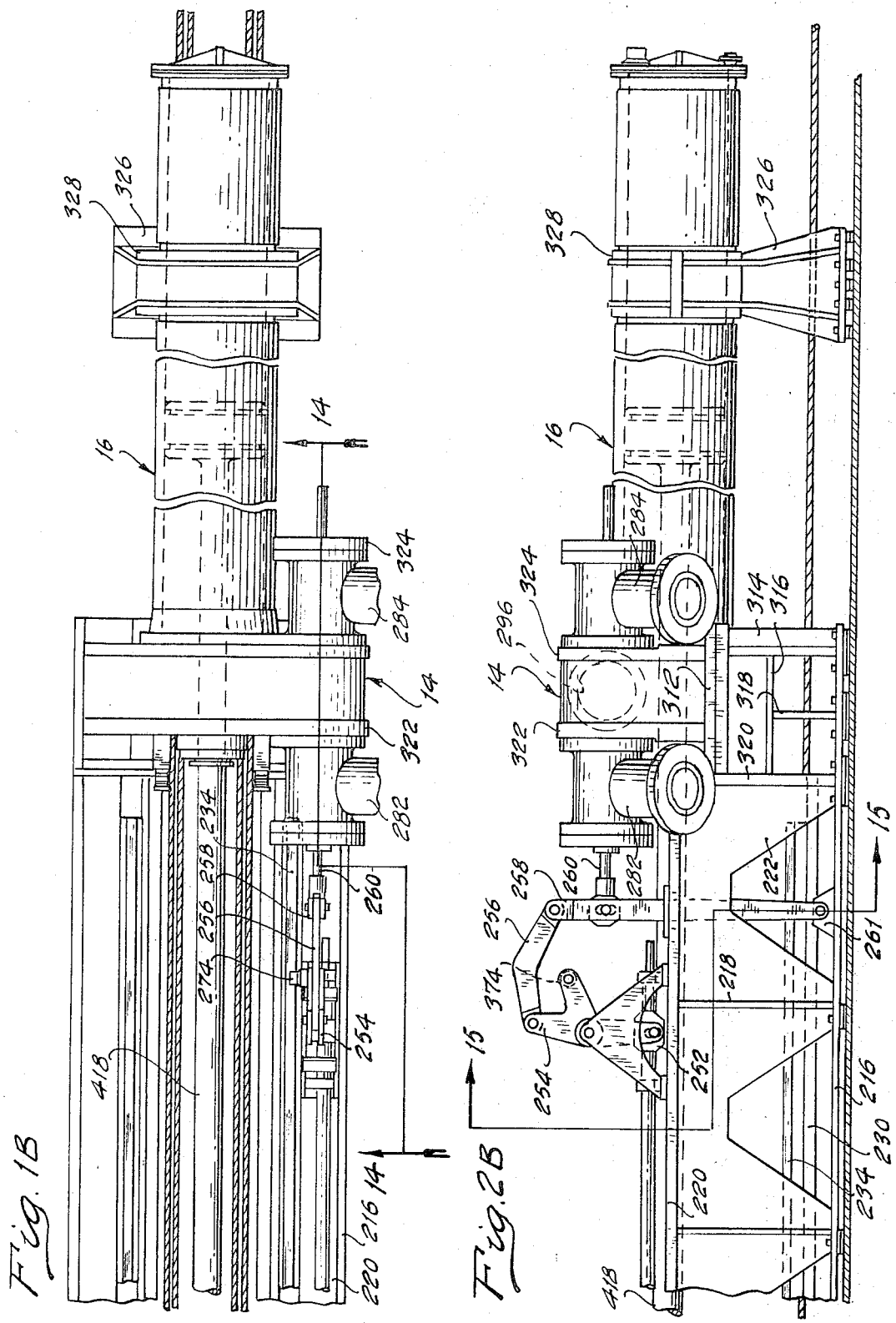

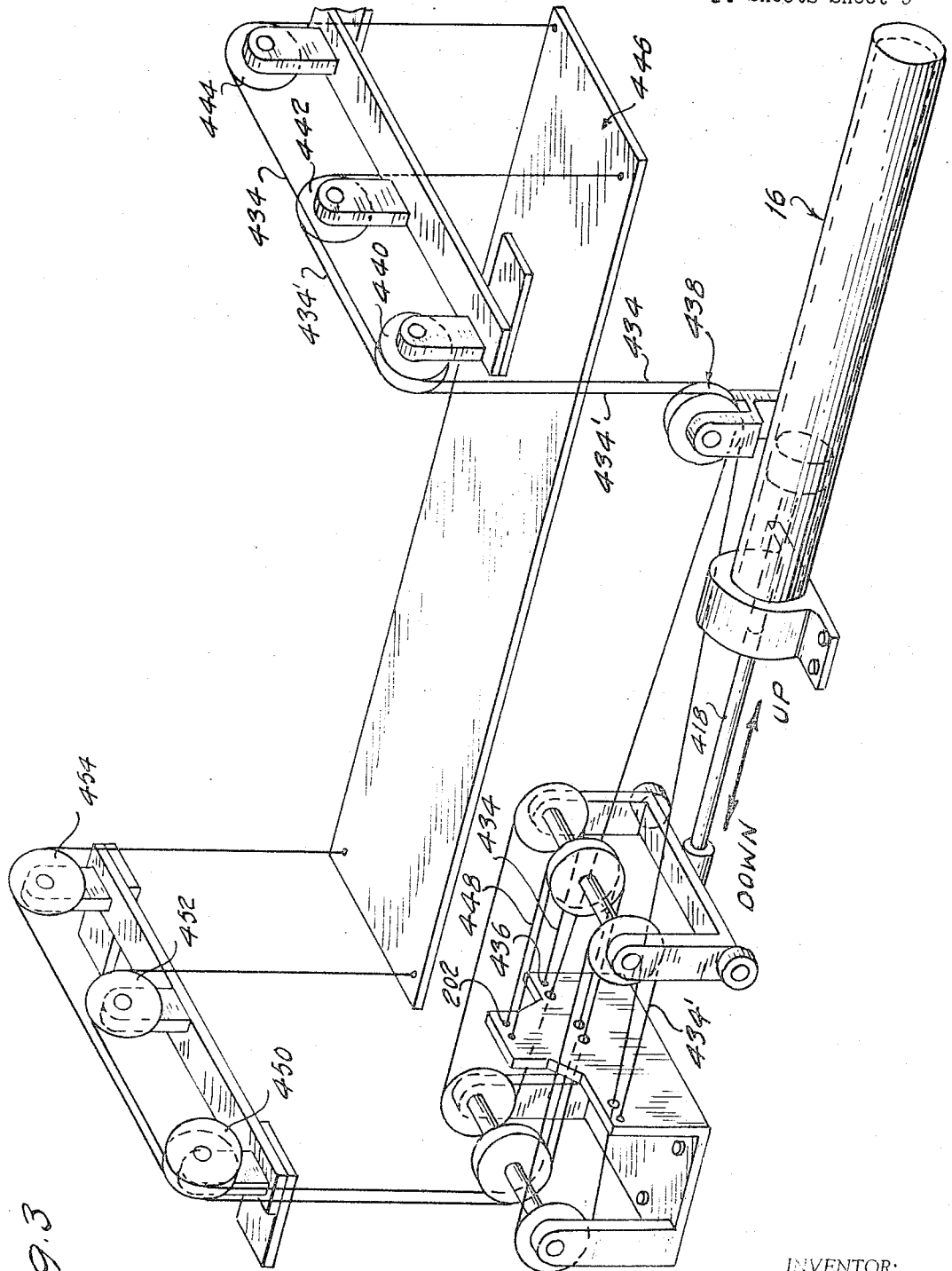

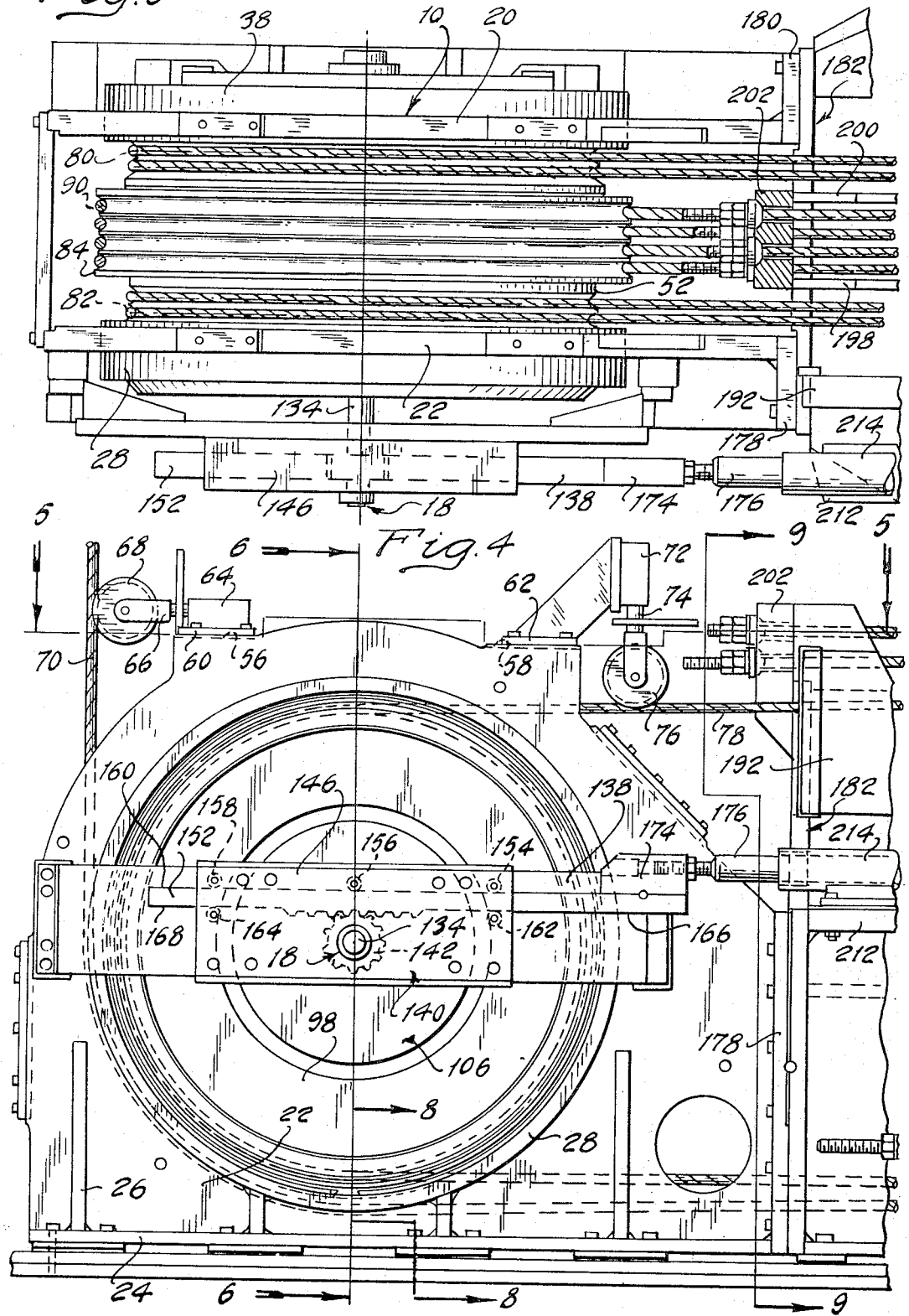

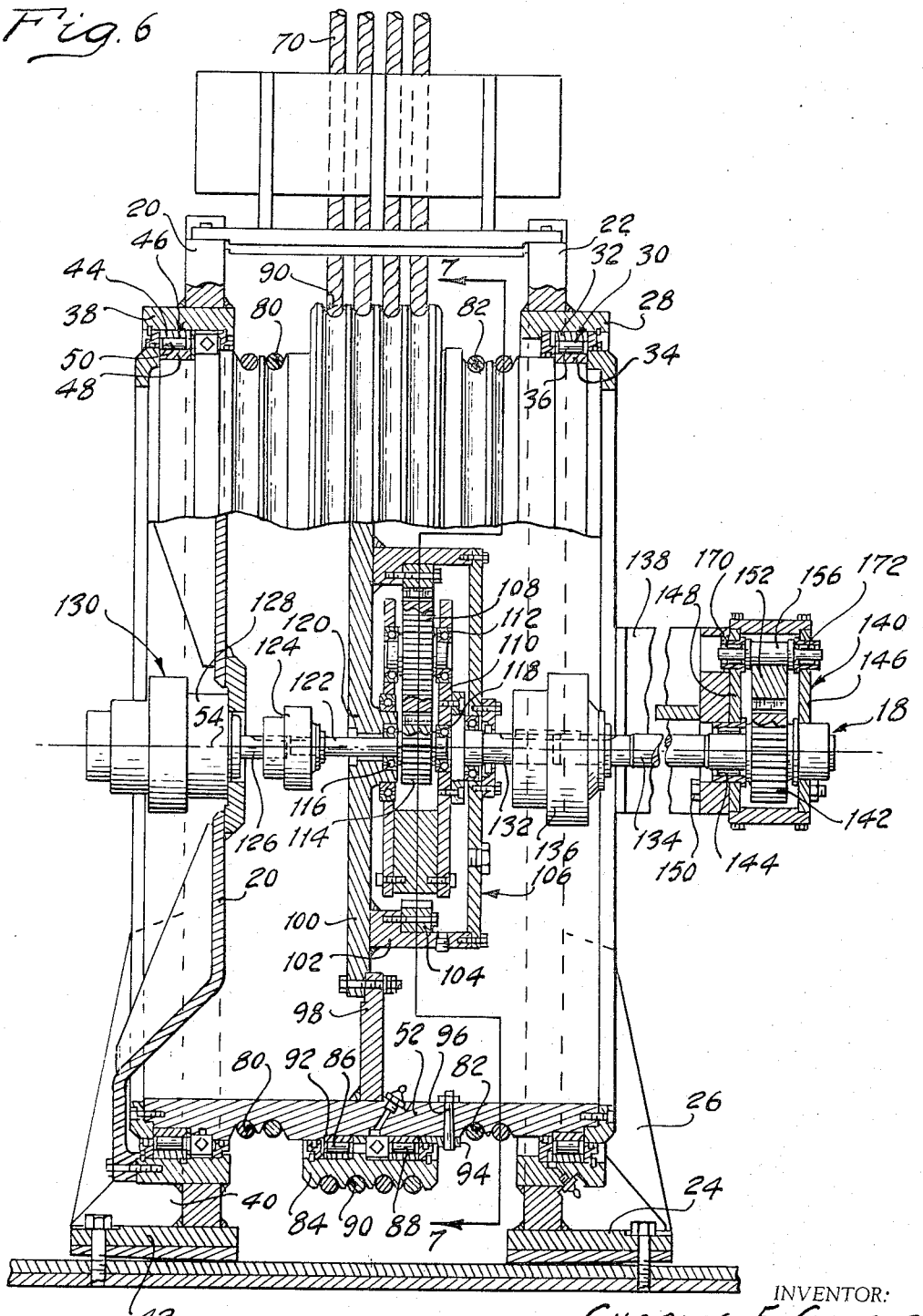

Oct. 17, 1967  C. E. GREGORY  3,347,525
HYDROSTATIC ENGINE AND SHEAVE ASSEMBLY
Filed May 31, 1966  14 Sheets-Sheet 6

Oct. 17, 1967

C. E. GREGORY 3,347,525

HYDROSTATIC ENGINE AND SHEAVE ASSEMBLY

Filed May 31, 1966

INVENTOR:
CHARLES E. GREGORY
BY:

ATTORNEYS.

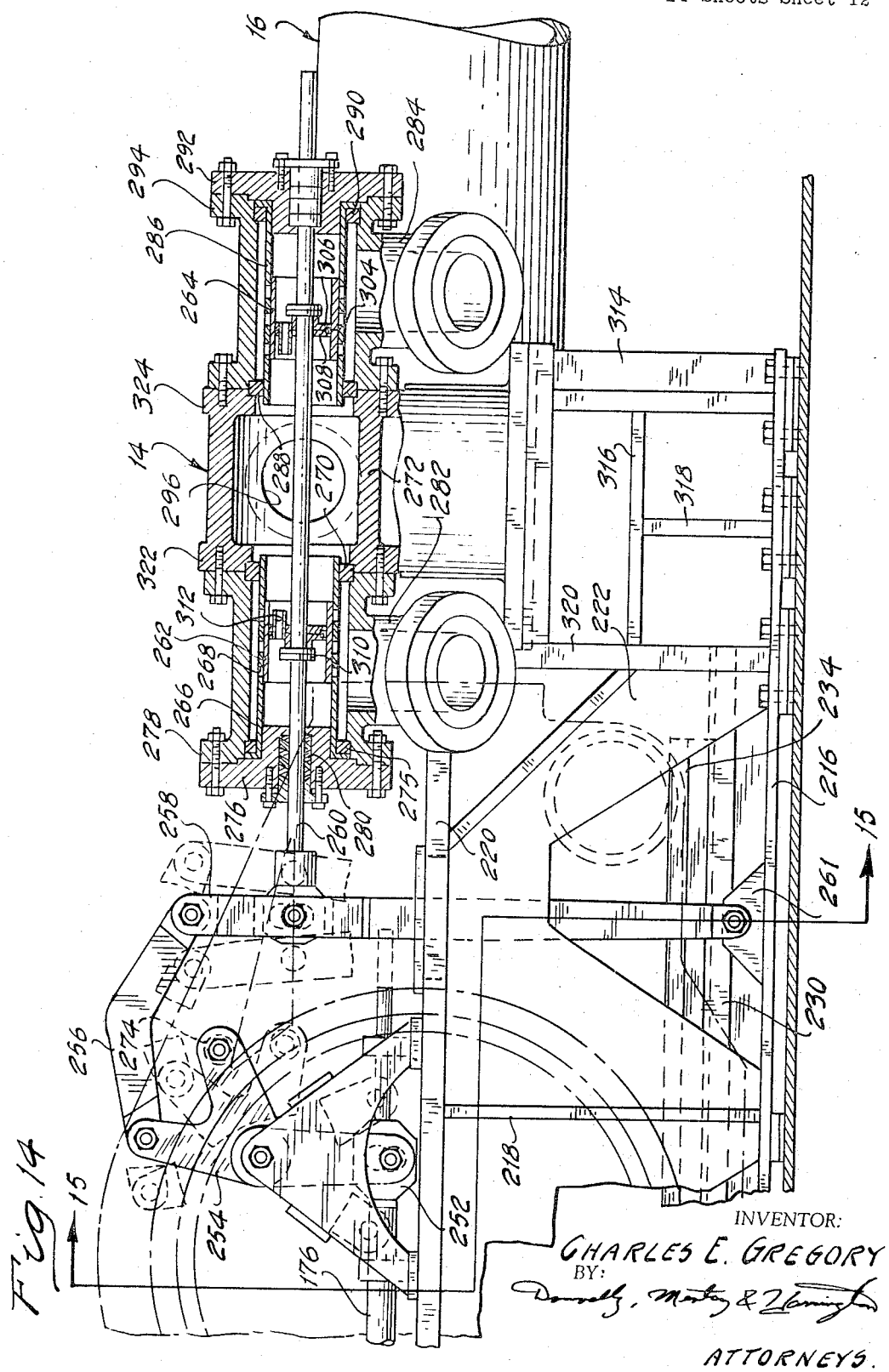

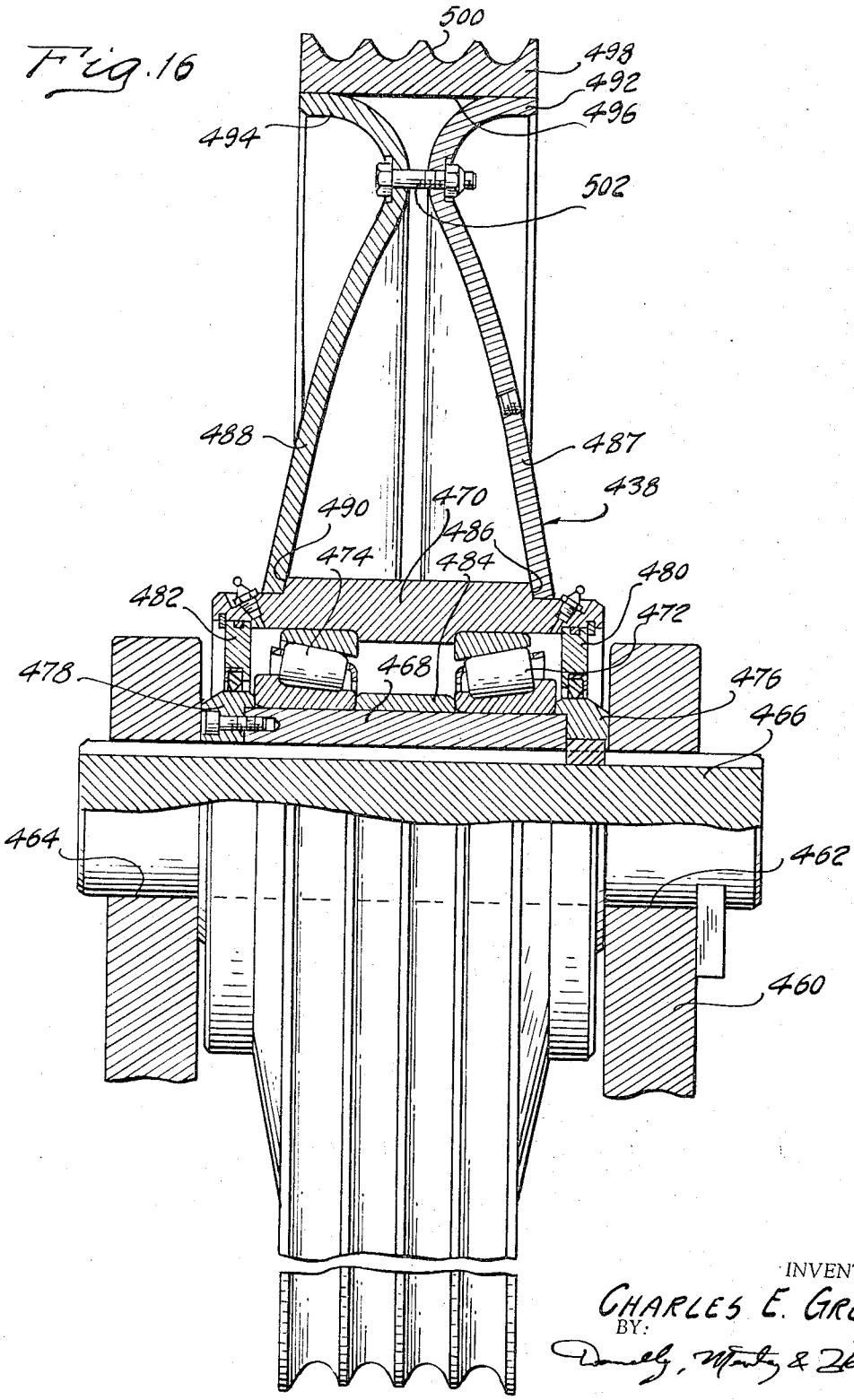

Oct. 17, 1967  C. E. GREGORY  3,347,525
HYDROSTATIC ENGINE AND SHEAVE ASSEMBLY
Filed May 31, 1966  14 Sheets-Sheet 14

INVENTOR:
CHARLES E. GREGORY
BY:
Donnelly, Marty & Harrington
ATTORNEYS.

# United States Patent Office 3,347,525
Patented Oct. 17, 1967

3,347,525
HYDROSTATIC ENGINE AND SHEAVE
ASSEMBLY
Charles E. Gregory, Anchorville, Mich., assignor to Jered
Industries Inc., Birmingham, Mich., a corporation of
Michigan
Filed May 31, 1966, Ser. No. 553,904
13 Claims. (Cl. 254—189)

My invention relates generally to powered cable and sheave assemblies, and more particularly to a cable and sheave assembly having hydrostatic pressure operated driving members and a speed control mechanism for regulating the rate of movement of driven portions of the mechanism.

My invention is adapted particularly to be used for operating elevators between two vertically spaced positions. Typical environments that are capable of embodying the improvements of my invention are naval aircraft carriers and amphibious assault ships of the type in U.S. Naval Fleet operations. I have chosen one such environment to include in this disclosure for purposes of describing a preferred embodiment of my invention.

Aircraft carriers of the type with which we now are concerned include aircraft elevators for raising naval aircraft from a so-called hangar deck at a lower level at an upper level flight deck. The same elevator can be used for returning the aircraft from the flight deck to the hangar deck following the completion of a mission and the return of the aircraft to the flight deck. The elevators are located usually on the starboard side of the ship near the aft quarter, and on the port side, forward quarter. When the elevator platforms are not in use, they can be locked at the flight deck level. The hydrostatic engine that powers the elevator can be controlled remotely, as will be explained subsequently. Provision is made for automatically causing the elevators to assume the flight deck position whenever a power failure occurs on the ship.

When power is available, the motion of the elevator can be controlled from a conveniently located control station, either on the hangar deck or on a gallery deck. These control stations regulate the direction of flow of hydrostatic fluid through the pressure passage of the engine.

The engine includes an accumulator that is charged with hydraulic pumps supplied with hydrostatic fluid from a suitable reservoir. The fluid is pumped into the accumulator until a predetermined pressure is reached. A regulated pressure of 1200 p.s.i. in the accumulator has been used in one successful working embodiment.

The working pressure from the accumulator during operation of the engine passes through a control valve to a hydrostatic piston and cylinder mechanism thereby controlling the effective length of the stroke of the piston. The force acting on the piston actuates the sheave arrangement of the engine, thereby changing the level of the elevator. Sufficient residual pressure is maintained in the engine cylinder by the control valve to permit the elevator platform to maintain a flight deck level, notwithstanding changes in the load that might occur on the platform.

When the control valve is caused to assume an open or exhaust position, the weight of the elevator platform causes the piston to return to its original position as fluid is forced from the engine cylinder through the control valve and back to the accumulator. The work performed by the elevator during this cycle causes a reduction of the pressure in the accumulator. Of course the hydraulic pumps tend to maintain a constant accumulator charge pressure to compensate for this loss. But even if a power failure were to occur, thus making it impossible to operate the hydraulic pumps, the accumulator still would retain sufficient residual pressure following one complete operating cycle to permit at least one more cycle to occur. Thus, in the case of a power failure during an emergency, it always will be possible to return the elevator to the flight deck location, where it can be locked.

Positive stops are provided at both the ends of the piston travel. By proper adjustment of the hoisting cables, the platform can be held at the flight deck level with a force against the flight deck level stops. In a similar fashion the platform can be held at the hangar deck level by adjustment of the down plunger stops. The locks, the pumps, and all safety devices are electrically interlocked with the pushbutton and hand control stations to prevent movement of the platform when such movement is unsafe. In an emergency caused by power failure, the platform can be moved by hand controls at the hangar deck control station.

The hydraulic engine itself, which is mounted horizontally, comprises a single acting piston and cylinder mechanism. A traveling sheave and carrier assembly is attached to the piston rod on guide rails, the latter in turn being supported by a suitable bed. When the piston rod is fully extended, the sheave and cable arrangement move the elevator to the hangar deck level. When the piston rod is fully retracted, the elevator is at the flight deck level. The foundation for the engine is by preference made of welded structural steel. The cabling for the sheaves provides a platform travel ratio of 2 to 1 with respect to the motion of the piston.

The control assembly for the hydrostatic engine comprises a main valve, a speed control device having a hydraulic motor and a mechanical feed-back mechanism for the valve, safety limit switches and a deceleration linkage mechanism for the valve.

When the operator energizes the control circuit, a pilot operated solenoid valve triggers the operation of a hydraulic motor mounted adjacent the relatively stationary sheave. This actuates the sun-gear of a planetary gear system located within the stationary sheave. The ring gear for the planetary gear unit of which the sun gear forms a part, is connected to the sheave and rotates with it about the sheave axis. The carrier for this planetary gear unit is sensitive to the differential motion of the sun gear and the ring gear. It, in turn, is mechanically connected to a pinion which engages a rack, the latter in turn being mechanically connected through a linkage system to the control valve. Thus the control valve is moved to an open position as the pilot valve is operated.

When the main hydraulic control valve moves to the open position, fluid enters the cylinder on the piston rod side of the cylinder, which accelerates the piston until the feed-back mechanism causes motion of the ring gear which overrules the driving tendency of the sun gear. Thus the carrier and the main control valve assume a so-called neutral or steady state condition in the open position. The feedback mechanism thus provides a speed control. When the feedback mechanism senses a change in the speed of the platform during this operating cycle, the rack and pinion tend to shift the main control valve to a compensating position. The control valve thus is caused to pass only a sufficient volume of fluid to cause the hydraulic piston to move at the desired speed. In a preferred embodiment of my invention, the system is calibrated to produce an elevator speed of 3 feet per second.

When the traveling sheave assembly is approximately two feet from the end of the stroke, a cam on the traveling sheave assembly contacts a deceleration linkage. The control valve spool then is returned mechanically to a neutral position to bring the piston to a controlled stop. A cam on the sheave assembly contacts a safety limit switch when the sheave assembly is approximately eighteen inches from the end of the stroke. This limit switch de-energizes the pilot operated solenoid valve which locks the hydraulic motor. When the control valve mechanism is caused to move to the down position, the feed-back mechanism again becomes operative to control the rate of passage of fluid through the valve to limit the rate of movement of elevator at the desired controlled speed.

The provision of an elevator system of the type above set forth being a principal object of my invention, it is a further object of my invention to provide a hydraulic motor and sheave assembly in an environment of the type above set forth wherein provision is made for economizing the space required to accommodate the engine.

It is a further object of my invention to provide a hydrostatic engine and sheave assembly of the type above set forth wherein provision is made for controlling the displacement of a flow control valve situated in the fluid feed passage for the fluid motor, thereby controlling the rate of motion of the driven portion of the system.

It is a further object of my invention to provide an engine and sheave assembly of the type above set forth wherein displacement of the flow control valve is sensitive to the driven speed of the platform through the medium of a mechanical feed-back system.

It is a further object of my invention to provide a mechanism of the type above set forth wherein the feed-back mechanism itself is situated in one of a pair of sheave assemblies, one of these assemblies being adapted for rotation about a stationary axis, and the other being adapted to shift relative to the other.

It is a further object of my invention to provide a hydrostatic engine and sheave assembly of the type above set forth wherein provision is made for substantially simplifying the construction of the cable deflecting sheaves in the system to provide added capacity for any given size, to reduce the space needed to accommodate it and to reduce the manufacturing cost of the assembly.

Further objects and features of my invention will become apparent from the following description and from the accompanying drawings, wherein:

FIGS. 1A and 1B together show a side elevational view of the hydrostatic engine and sheave assembly of my invention;

FIGS. 2A and 2B together show a plan view of the structure of FIG. 1;

FIG. 3 is a schematic drawing showing the sheave and cable arrangement for the structure of FIGS. 1A, 1B, 2A and 2B, as well as a powered platform, not shown in the other views.

FIG. 4 is a cross sectional view taken along the plane of section line 4—4 of FIG. 1A;

FIG. 5 is a view similar to FIG. 1A, and is taken along section line 5—5 of FIG. 4;

Figure 2A:
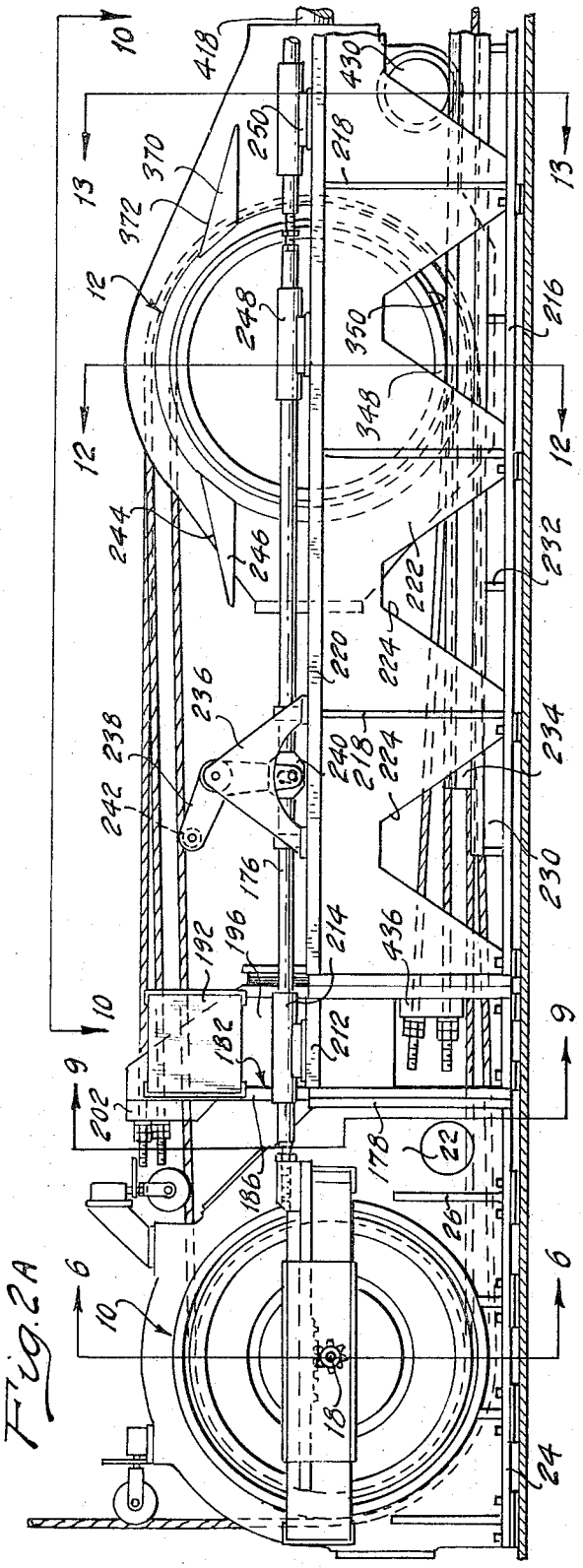
Figure 7:
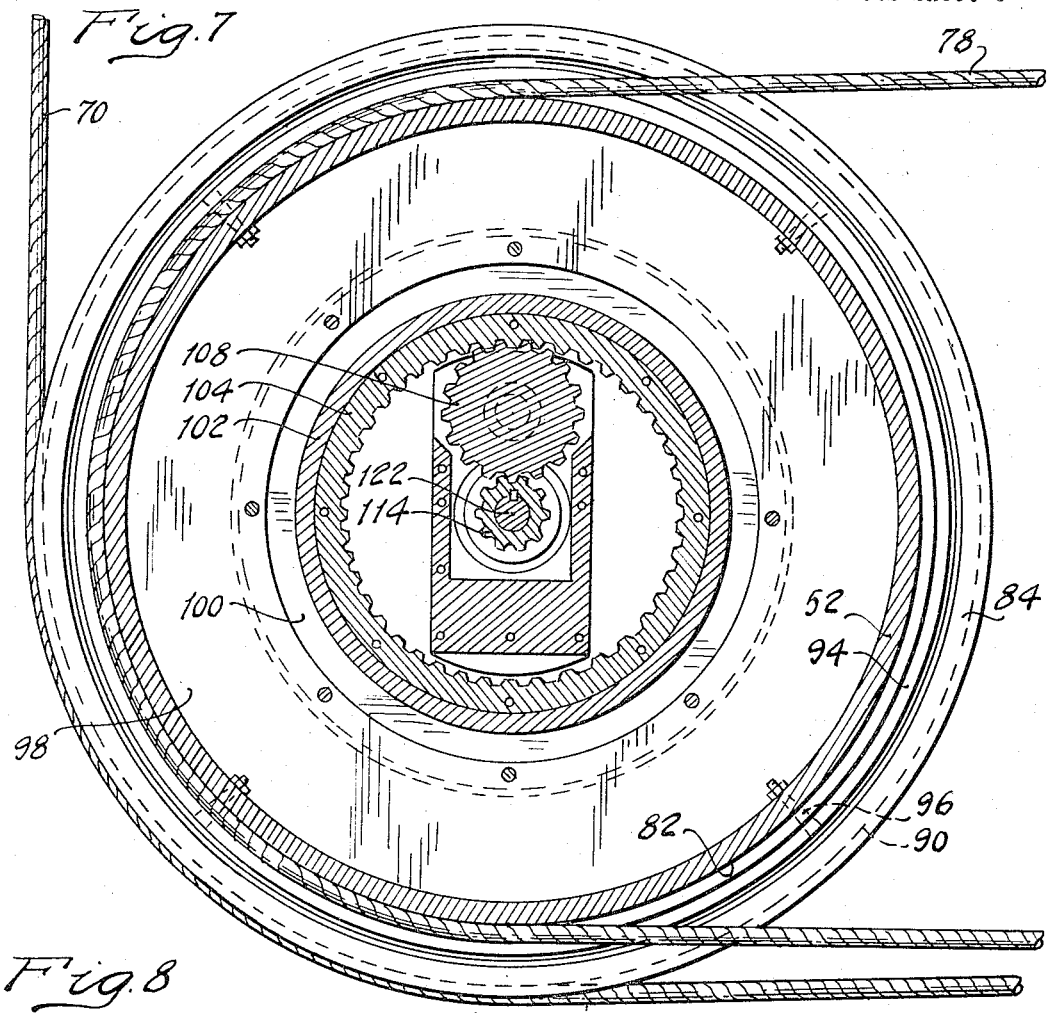
Figure 8:
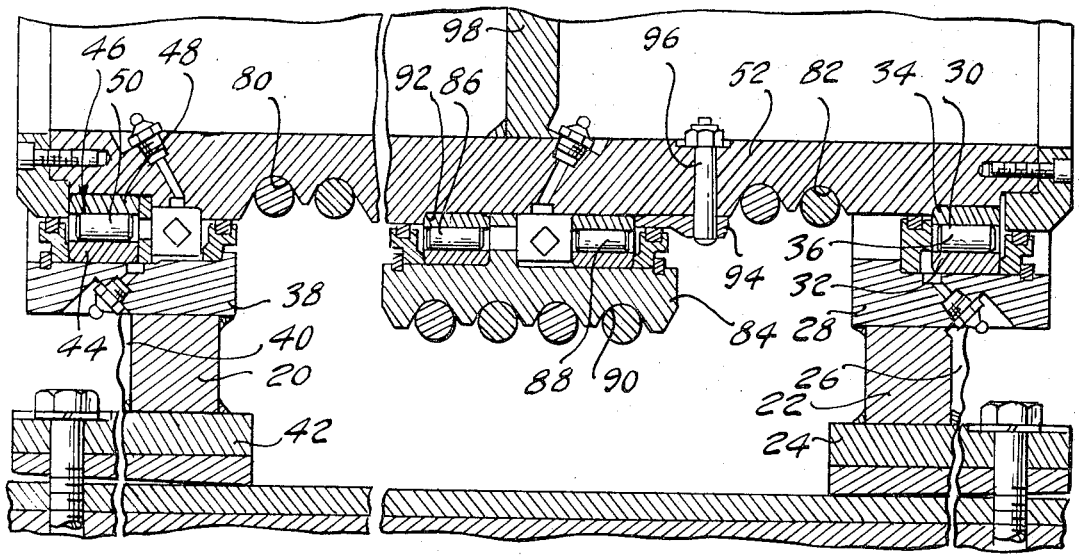
Figure 9:
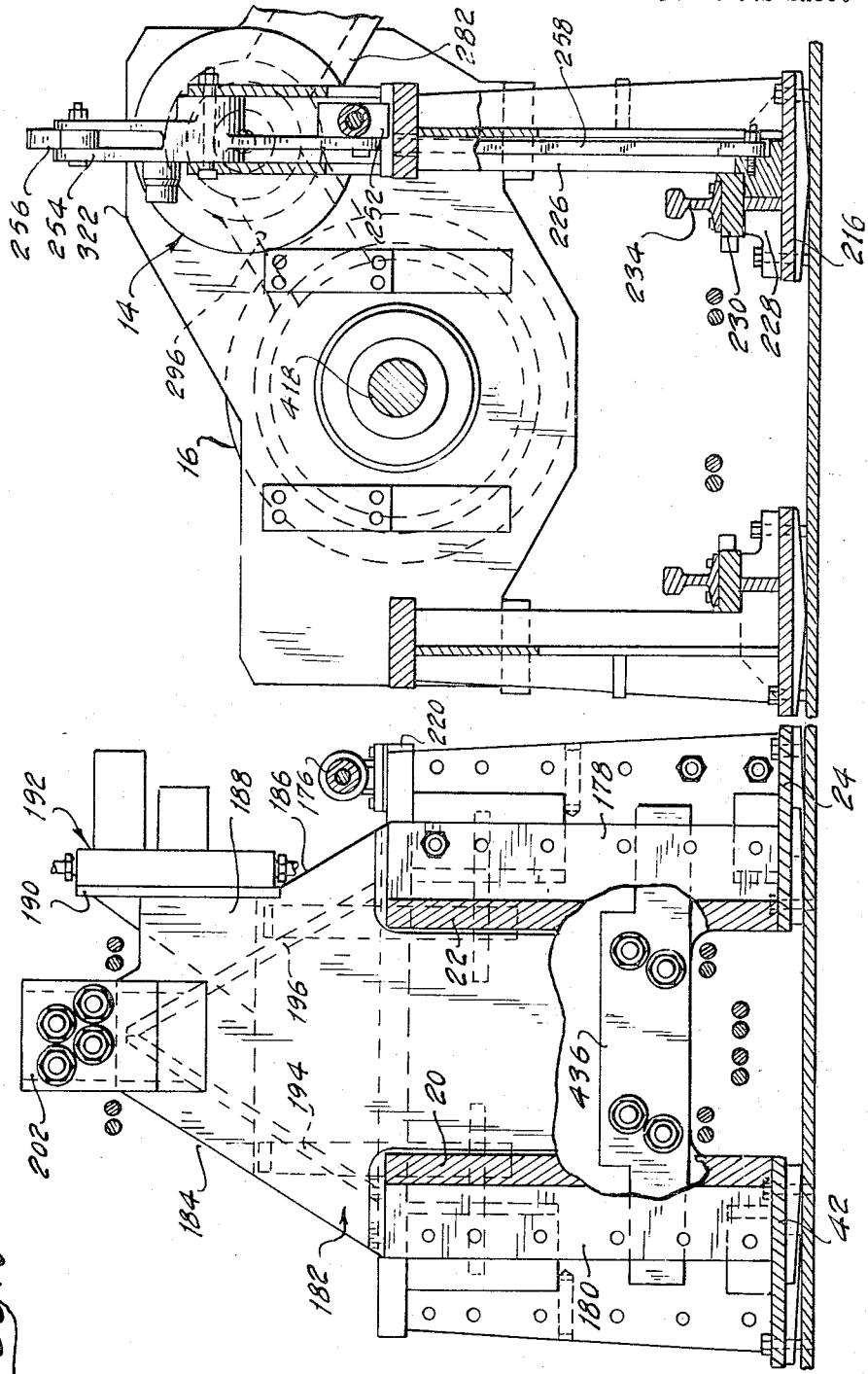
Figure 10:
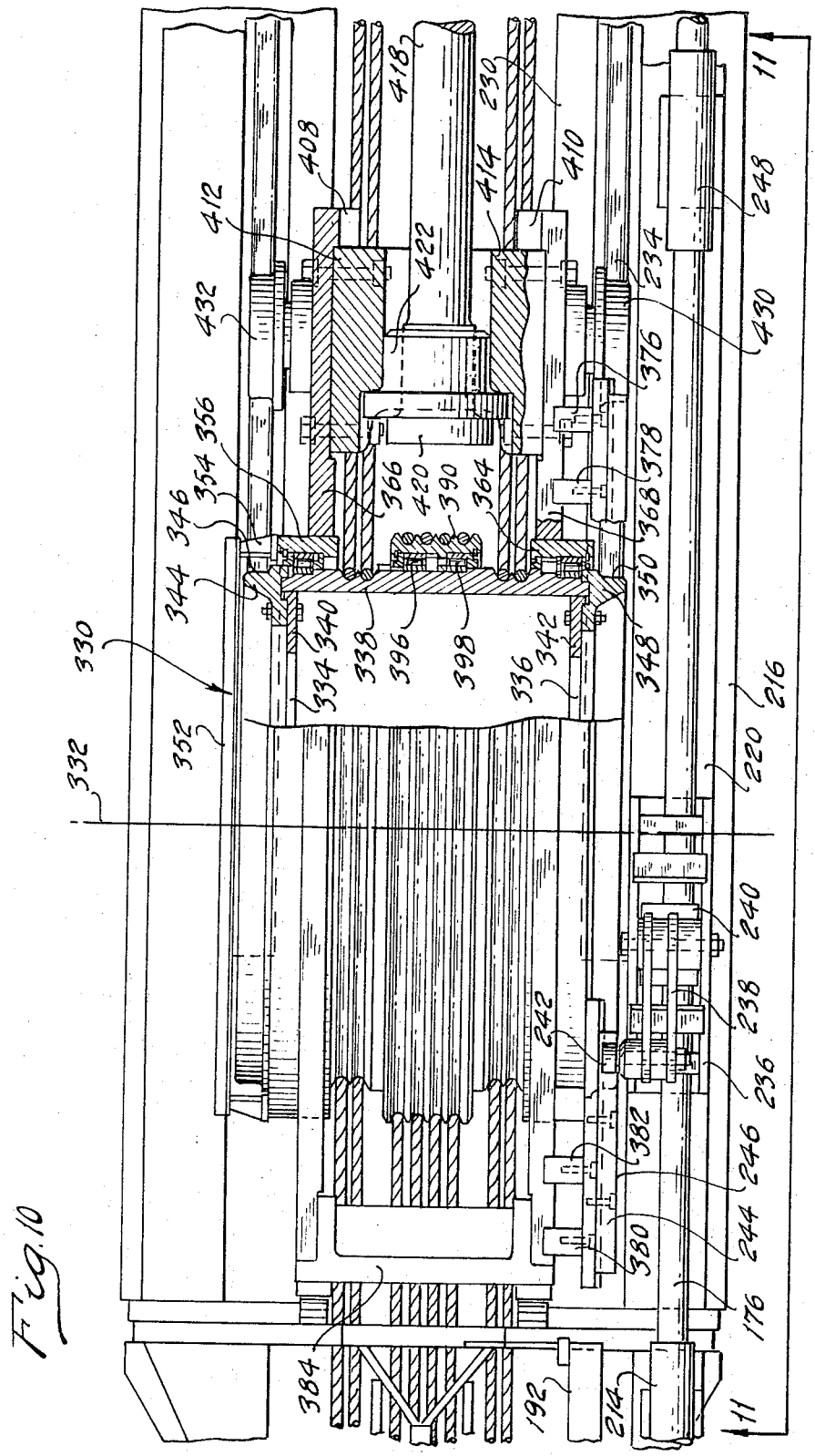
Figure 11:
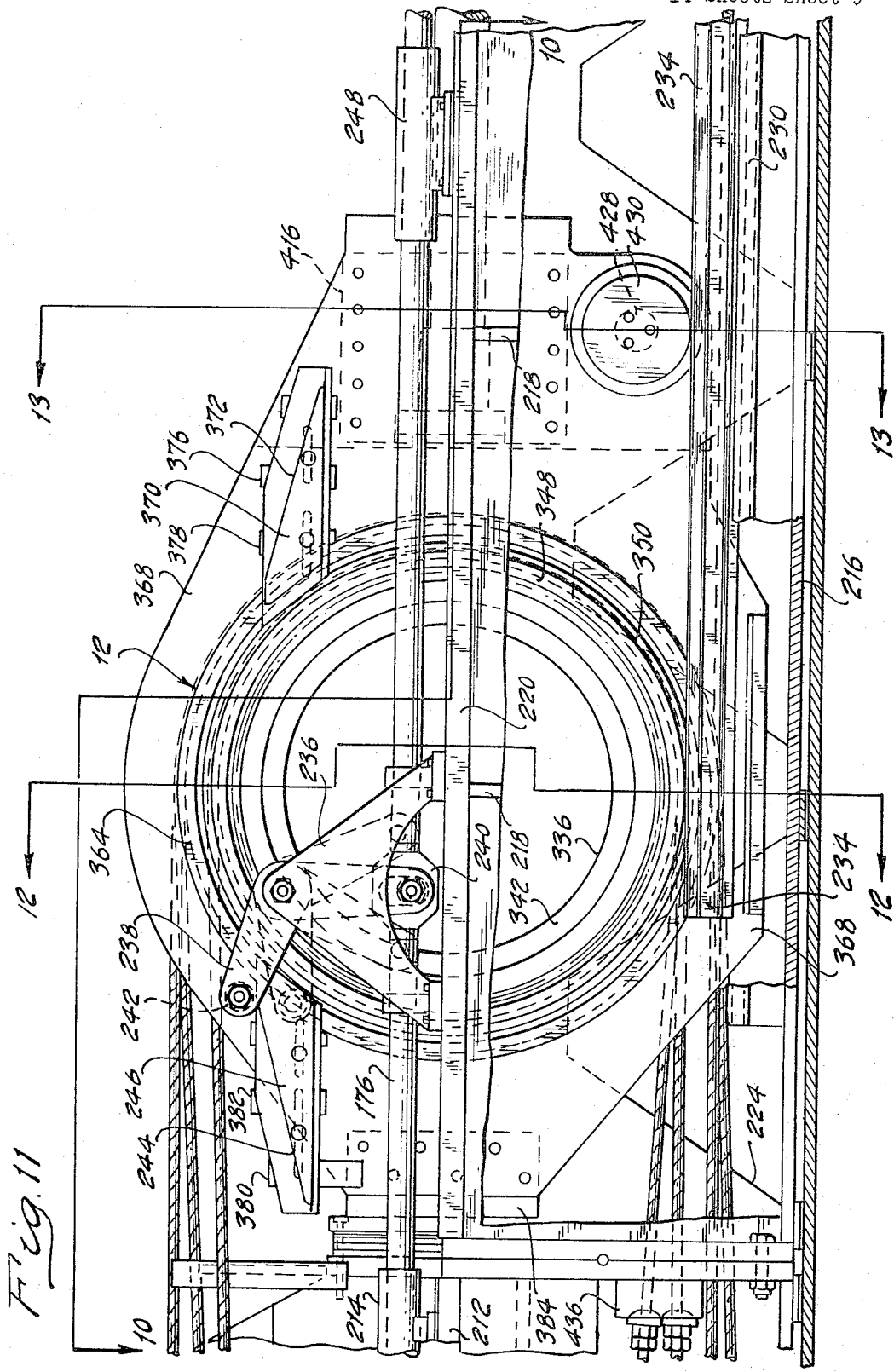
Figure 12:
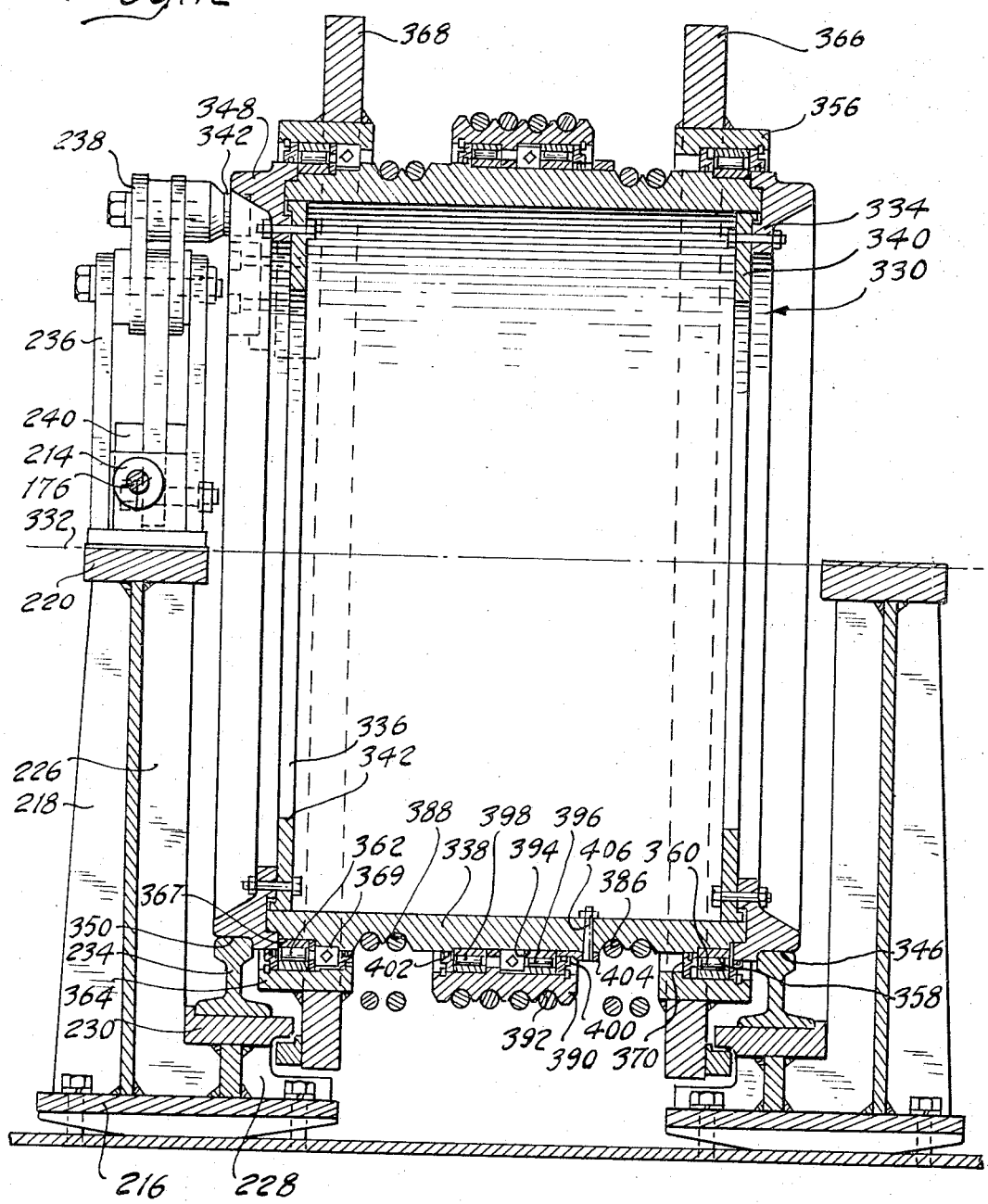
Figure 13:
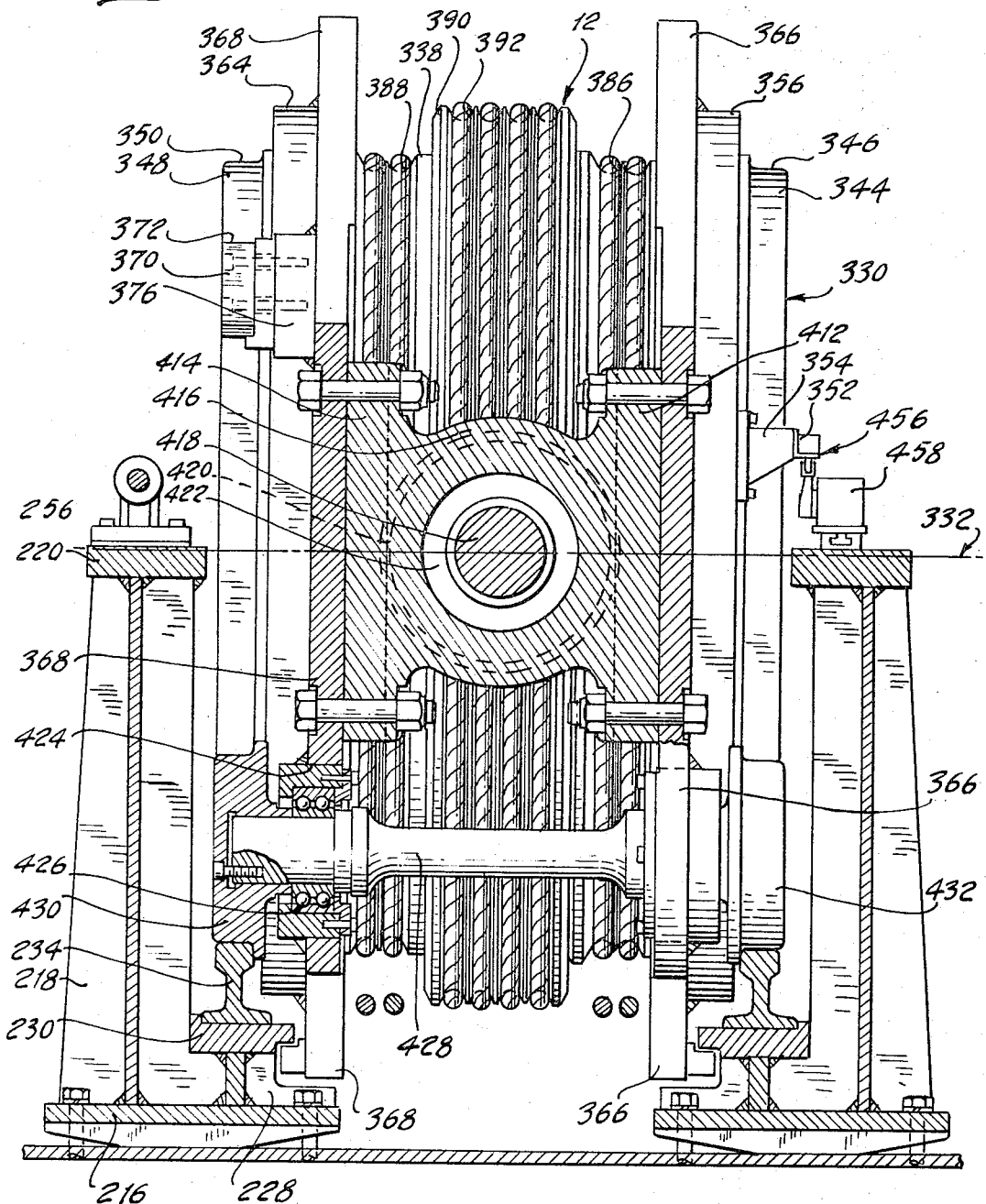
Figure 17:
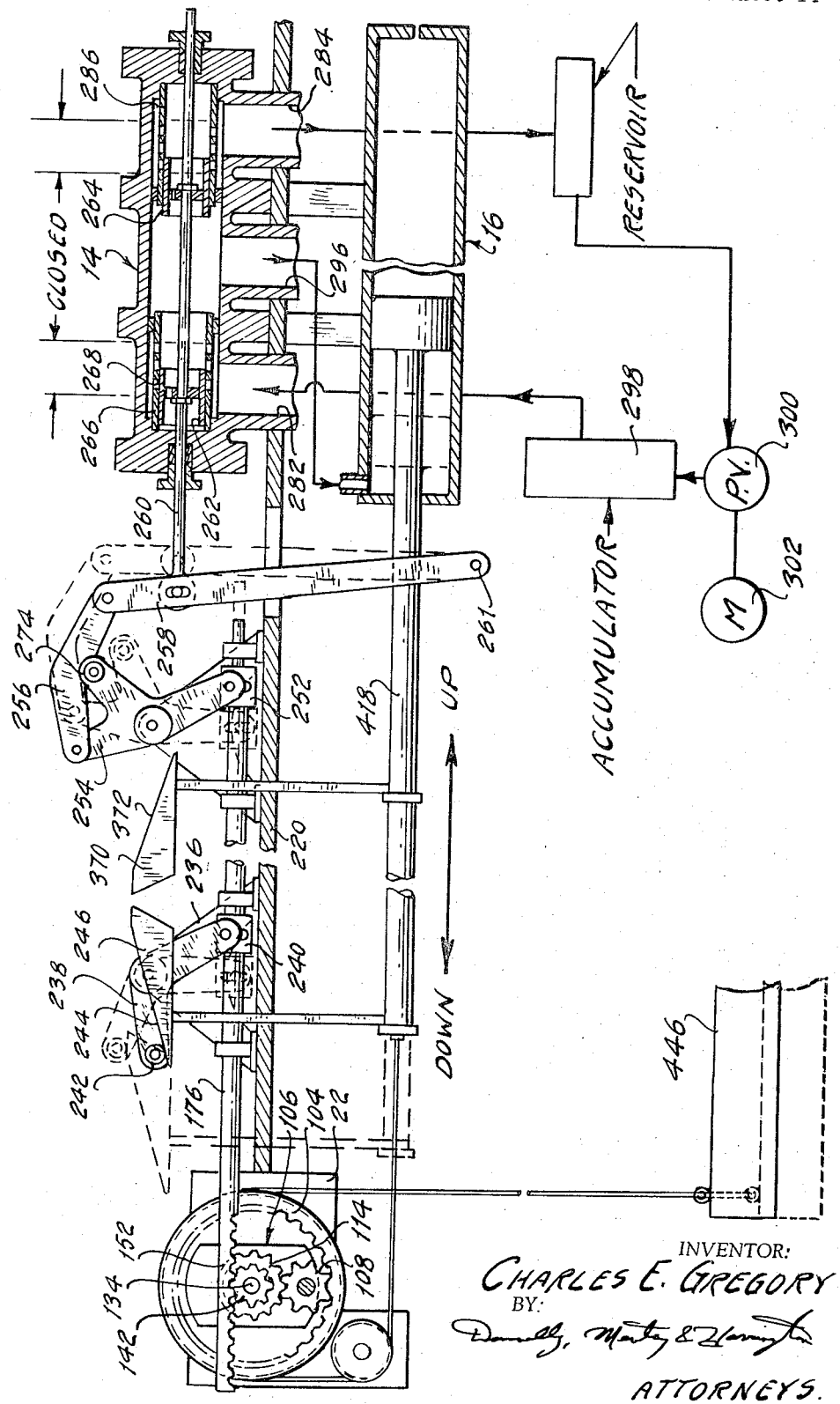

FIG. 6 is a transverse view of the structure of FIGS. 4 and 5, as seen along the plane of section line 6—6 of FIGS. 2A and 4;

FIG. 7 is a transverse cross sectional view taken along section line 7—7 of FIG. 6, partly in elevation, showing a sheave assembly that is adapted for rotation about a fixed axis;

FIG. 8 is an end view of the structure of FIG. 7 as viewed along the plane of section line 8—8 of FIG. 4;

FIG. 9 is a transverse cross sectional view taken along section line 9—9 of FIGS. 2A and 4;

FIG. 10 is a plan view of the movable sheave assembly as seen from the plane of section line 10—10 of FIG. 2A;

FIG. 11 is a transverse cross sectional view of the structure of FIG. 10 as viewed from the plane of section line 11—11 of FIG. 10;

FIG. 12 is a transverse cross sectional view of the movable cable deflecting sheave used in the system illustrated schematically in FIG. 3 and is taken along section line 12—12 of FIGS. 2A and 11;

FIG. 13 is a cross sectional view taken along section line 13—13 of FIGS. 2A and 11;

FIG. 14 is a cross sectional view of the control valve assembly and is taken along section line 14—14 of FIG. 1B;

FIG. 15 is a cross sectional view taken along section line 15—15 of FIGS. 2B and 14;

FIG. 16 is a cross sectional view of a fixed sheave; and,

FIG. 17 is a view of the valve assembly and accumulator circuit.

Figure 1A:
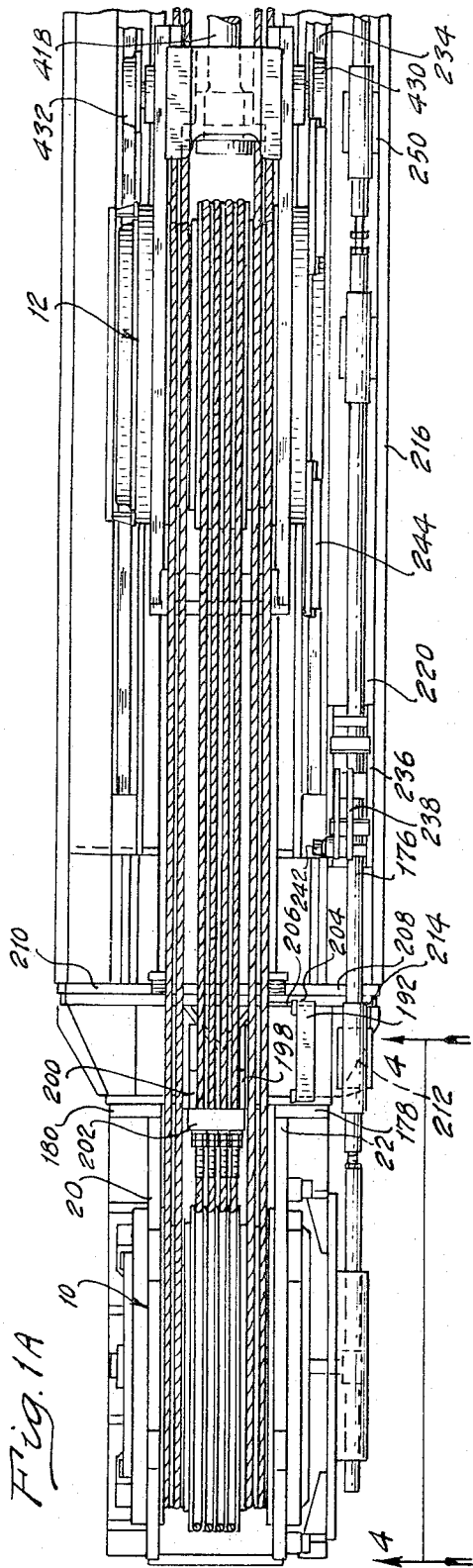

In FIGS. 1A and 1B, numeral 10 generally designates a fixed sheave assembly which is illustrated more particularly in FIGS. 4, 5, 6, 7 and 8. Numeral 12 indicates generally a movable sheave assembly which is illustrated more particularly in FIGS. 10, 11, 12 and 13. Numeral 14 indicates generally the main control valve assembly which is illustrated more particularly in FIGS. 10, 11, 12 and 13. Numeral 14 indicates generally the main control valve assembly which is illustrated more particularly in FIGS. 14 and 17. The fluid motor which comprises a piston and cylinder assembly, is illustrated in FIG. 1B at 16.

The sheave assembly 10 is situated for rotation about an axis 18 for rotation between spaced parallel side walls 20 and 22.

The plate 22 is supported by a structural base member 24. Webs 26 are situated between the lower extremity of the plate 22 and the base 24 and also on the lower side of the plate 22. Webs 26, as seen in FIG. 8, are adapted to support an outer bearing race 28 for a roller bearing assembly 30 which is coaxial with the axis of the sheave 10.

The bearing assembly 30 comprises a cylindrical race 32 supported by the ring 28. It is provided also with an inner race 34 and rollers 36 situated between the races 32 and 34.

The bearing surrounds the outer periphery of the plate 22.

In a similar fashion the outer periphery of the plate 20 is secured to a bearing support ring 38 which is supported by webs 40, the latter being similar to webs 26. Webs 40 are supported by a base structural member 42.

A ring 38 surrounds an outer bearing race 44 for a bearing assembly 46. An inner bearing race 48 is concentric to the race 44 and bearing rollers 50 are situated between the races.

Journaled by the bearing assemblies 30 and 46 is a sheave drum 52 which is adapted for rotation about axis 54. The two axial margins of the drum 52 engage inner bearing races 48 and 34.

As indicated best in FIG. 4, the plate 22 is formed with two spaced horizontal shoulders 56 and 58. These support platforms 60 and 62, respectively. The plate 20 also is formed with horizontal shoulders that correspond to shoulders 56 and 58. These shoulders engage the opposite ends of the platforms 60 and 62.

Platform 60 supports a slack cable switch assembly 64 having an electrical switch which is actuated by plunger 66. The end of the plunger carries an idler pulley 68 adapted to engage a rope or cable 70, which will be described subsequently. The platform 62 supports a slack cable switch 72 which is mechanically operated by a plunger 74. The lower end of the plunger 74 carries an idler pulley 76 which engages a cable 78.

A pair of cable grooves is formed in the drum 52. One groove is situated adjacent each of the outboard sides of the drum 52. The two pairs are identified separately by reference characters 80 and 82 in FIG. 7.

The central region of the drum provides a support for a third sheave which includes a sheave ring 84 surrounding the drum 52. Situated between the ring 84 and the drum 52 is a pair of spaced bearing assemblies 86 and 88. The drum 52 supports the inner race of the bearings 86 and 88 and the ring 84 supports the outer race. Thus, the ring 84 can rotate relative to the drum 52.

The outer periphery of the ring 84 is formed with four cable grooves which are identified generally by reference character 90.

The inner race for bearing 86 engages a shoulder 92 formed on the drum 52. The inner race for the bearing 88 engages a retainer ring 94 which is held fast by an anchor pin 96 received through a suitable opening in the drum 52.

As will be explained subsequently, the ring 84 during operation is caused to rotate in a direction opposite to the direction of rotation of the drum 52. The unique bearing arrangement shown in part at 30, 46, 86 and 88 makes it possible to secure the benefits of three cable sheaves while using only three bearing assemblies. Ordinarily, if each sheave were to be mounted for independent rotation, each would require two spaced bearings. I thus have provided a simplified construction which requires substantially reduced space and at the same time reduced cost due to the elimination of three independent bearings for the sheaves.

The inner margin of the drum 52 carries a radially extended wall 98. Welded to the inner margin of the wall 98 is a ring gear support 100. Welded to the support 100 is a ring 102 within which is located a ring gear 104 for a planetary gear unit 106. Ring gear 104, as seen in FIG. 6, engages pinions 108 which are journaled rotatably on a carrier 110, pinion bearings 112 being provided for this purpose. Pinions 108 engage drivably a sun gear 114 having spaced sun gear bearings 116 and 118. Bearing 116 is received within a bearing recess formed in a bearing retainer 120 which is secured in turn to the support 100.

Sun gear 114 is formed with a sun gear shaft 122 which extends through the support 100. It is connected by means of a torque limiting slip clutch 124 to a power output shaft 126 for a gear reduction unit 128. The power input element of the gear unit 128 is drivably connected to the driven element of the hydrostatic motor 130.

The motor 130 is designed in a preferred embodiment of my invention to operate at a constant speed of 500 r.p.m. It is an integral assembly of which the reduction gear unit 128 forms a part. The reduction ratio can be ten-to-one so that the speed of the power output shaft 126 is 50 r.p.m.

The bearing 118 is received within a bearing recess formed in the carrier 110. A power output shaft 132 is connected drivably to the carrier 110. It in turn is connected to the pinion shaft 134 through a torque limiting slip clutch 136.

Secured to the plate 22 by means of a supporting bracket 138 is a rack and pinion assembly 140. It includes a drive pinion 142 which is connected directly to the pinion shaft 134. Pinion 142 is journalled on either side thereof in a straddle mounted fashion. One of the mounting bearings is illustrated at 144. The pinion 142 is journalled between the side plates 146 and 148 of a U-shaped bracket which is bolted by bolts 150 to the bracket 138. Pinion 142 engages drivably the teeth of a rack 152 which is adapted to reciprocate in a horizontal direction transverse to the axis of shaft 134. Three rollers 154, 156 and 158 engage the upper surface 160 of the rack 152. These rollers cooperate with rollers 162 and 164 which engage the lower surfaces 166 and 168 of the rack, respectively.

One of the rollers 156 is illustrated in particular detail in FIG. 7. It is journalled in a straddle mounted fashion by a pair of spaced needle bearings 170 and 172. The rack 152 is connected mechanically, as shown at 174, to a valve operating rod 176. As will be explained subsequently, the rod 176 controls the displacement of the flow control valve which in turn controls the direction of pressure distribution to a fluid pressure operated servo for the sheave and to control the exhaust of fluid from the servo as the sheaves are moved through the working cycle. The planetary gear unit 106 and the rack and pinion, shown at 142 and 152, sense the differential in speed between the drum 52 and the motor driven shaft 126. When this differential in speed corresponds to a speed of three feet per second of the driven member of the sheave, the rotary speed of the carrier 110 is zero. Any deviation in the speed of the sheave, however, will cause a displacement of the carrier and hence a displacement of the valve that is controlled by the rack and pinion. If the speed of the drum 52 increases, the valve will be moved in a direction which will reduce the degree of communication between the pressure source and the servo which operates the sheave. This then will tend to restore the speed of the drum to the design speed. Conversely, if the speed of the drum should decrease, the valve will be caused to open thereby causing the servo to speed up and restore the speed of the drum 52 to the proper design speed.

Inertia forces which might tend to upset the controlled displacement of the carrier 110 cannot be transmitted from the motor to the sun gear since this is prevented by the slip clutch 124. The clutch 124 is adequate for transmitting to the sun gear 114 a sufficient torque to effect controlling motion of the valve during normal operation, but any unusual inertia forces will be isolated from the valve structure by the torque limiting clutch 136.

The clutch 136 absorbs shock loads due to inertia when the driven member of the sheave system returns to the neutral or lowered position. Under these circumstances the shaft 134 acts as a torque input shaft for the gear unit. Unusual inertia forces, if they were allowed to be transmitted from the shaft 134 to the shaft 132, might cause abnormal displacement of the flow control valve. This condition is limited by the torque limiting feature of the clutch 136.

The bracket 138 is secured at either longitudinal end to the side plate 22 as indicated best in FIGS. 4 and 6.

As indicated best in FIGS. 1A and 2A, a structural supporting block 178 is welded to the right hand side of side plate 20 in a vertical position. The base is secured to the base member 24. A similar structural member 180 is situated on the opposite side of the sheave, as indicated best in FIG. 1A.

As indicated best in FIG. 4 as well as in FIGS. 1A and 2A, an end wall 182 is secured to the right hand sides of the members 178 and 180. Wall 182 is formed with a tapered upward extremity, the sides of which are tapered, as indicated at 184 and 186. Side 186 includes a boss 188 to which is secured a supporting plate 190 for a manifold block 192. This forms a part of the hydrostatic circuit for the fluid motor in the valve controls for the elevator.

A pair of structural plates 194 and 196 is secured to the right hand side of the wall 182. They are disposed on an angle, as indicated best in FIG. 4. The upper extremities of the plates 194 and 196 are joined together to form the vertex of a triangle.

Two vertical supporting plates 198 and 200 are secured to the upper surfaces of the plates 194 and 196. These plates 198 and 200 support a cable anchoring block 202.

As indicated best in FIG. 1A, a second supporting wall 204 is situated in parallel disposition with respect to wall 182. A gusset plate or web 206 is situated between the wall 204 and the manifold block 192. Two laterally disposed vertical supporting plates 208 and 210 are secured to the right hand side of the wall 204.

The walls 182 and 204 are secured together by a platform 212 on which is positioned a bearing block 214. The valve operating rod 176 is slidably positioned within the bearing block 214.

As best indicated in FIGS. 1 and 5, there is a base member in the form of a runner of rectangular cross sectional dimension on each transverse side of the sheave assembly. These rods are indicated by reference character 216. Vertically disposed ribs 218 are positioned at longitudinally spaced locations along the runner 216. These tie together the runner 216 with an upper runner 220 extending parallel to the runner 216. One runner 220 is situated on each side of the assembly.

In between each pair of webs 218 is a structural plate 222. It bridges together two adjacent ribs 218 and the upper and lower runners 220 and 216. It can be formed with a cut-out center section, as indicated at 224.

Located on the inboard side of the assembly adjacent each web 218 is another supporting web 226. These webs 226 are provided with platform portion 228 on which is positioned a rail base runner 230 which extends longitudinally. Disposed between each of the webs 226 is an additional transverse support 232 for the base 230. As indicated best in FIG. 1, mounted upon the base 230 is a rail 234 which is adapted to support a cooperating wheel portion of the sheave assembly 12, as will be explained subsequently with reference to FIGS. 9, 10, 11, 12 and 13.

Mounted on top of the runner 220 on the lower side of the plan view of FIG. 2A is a bracket 236 for pivotally supporting a bell crank lever 238. The lower end of the bell crank lever 238 is connected to the valve operating rod 176 by means of a coupling 240. The other end of the bell crank lever 238 carries a cam follower 242, which is adapted to engage a cam surface 244 formed on the cam element 246 which in turn is carried by the sheave assembly 12. As the sheave assembly 12 moves in a left hand direction as viewed in FIG. 1A, cam surface 244 is adapted to engage the cam follower 242 thereby rotating the bell crank 238 in a clockwise direction. This in turn causes a shifting movement of the valve operating rod 176 in a left hand direction. This closes a valve upon lowering of the elevator to the lowest position. The platform thus comes to a controlled stop as it engages a mechanical abutment at the lower position.

Positioned also on the runner 220 are two additional bearing blocks 248 and 250. These assist in supporting the valve operating rod 176.

The right hand end of the valve operating rod 176, as viewed in FIG. 1A, is connected by means of a coupling 252 to the lower end of a bell crank lever 254. The upper end of the bell crank lever 254 is connected to a linkage element 256, the other end of which is connected to the upper end of a lever 258. The lower end of the lever 258 is pivoted to a bracket 260 supported by the base member 216.

An intermediate part of the lever 258 is connected to a valve stem 260 to which is connected a pair of valve cylinders 262 and 264 as shown in FIGS. 14 and 17.

The valve cylinders 262 and 264 are substantially identical. Valve cylinder 262 is slidably positioned within a valve sleeve 266 having a series of ports 268 formed therein. The right hand side of the sleeve 266 is supported by a closure wall 270 which is secured at its periphery to a valve housing 272. The left hand end of the sleeve 266 is supported by closure wall 274 which in turn is positioned within the housing 272. The left hand end of the sleeve 266 is closed by a closure member 276 which is bolted at its periphery to a flange 278 formed on the housing 272. A wall 275 for the left end of sleeve 266 corresponds to the wall 270 at the right end. The rod 260 is received through a central opening formed in the wall 276. A fluid seal 280 is positioned in the openings surrounding the rod 260.

A high pressure conduit 282 communicates with the interior of the housing 272 at a region surrounding the sleeve 266. A conduit 296 extends to the left hand side of the piston which is indicated in an outline fashion in FIG. 2. A low pressure fluid conduit 284 communicates with the low pressure reservoir as seen in FIG. 17. Conduit 282 communicates with the high pressure accumulator. Conduit 284 extends to the right hand side of the housing 272 at a region that surrounds the sleeve 286 for the valve cylinder 264. Sleeve 286 is supported at its left hand side by a closure wall 288 secured at its periphery to the interior of the housing 272. The right hand end of the sleeve 286 is supported by an enclosure wall 290. Received within the housing 272 the right hand opening of the sleeve 286 is closed by an end closure plate 292 which is bolted to a flange 294 formed on the right hand end of the housing 272. The lower pressure conduit 284 extends from the right hand side of the piston illustrated in outline fashion in FIG. 2B.

The central region of the housing 272 is in fluid communication with a fluid delivery conduit 296. The accumulator is charged by means of a pump 300, which in turn is powered by a motor 302.

The valve cylinder 262 is formed with an annular shoulder 304 which is engaged by the peripheries of juxtaposed transverse walls 306 and 308. These walls, 306 and 308, are centrally apertured to receive a reduced diameter portion of the rod 260. The walls 306 and 308, as seen in FIG. 14, are held against the shoulder on the rod 260 by a split clamping ring 310 which is held fast on the rod 260 by means of an annular groove. A permanently opened flow control orifice 312 is formed in the walls 306 and 308.

The construction of the cylinder 264 and the sleeve 286 is similar to the construction of the cylinder 262 and the sleeve 266 and need not be described in further detail.

As the cylinders 264 and 262 are moved by the rod 260, the movement of the elevator can be controlled. Movement of the valve in either direction from the neutral position progressively increases the flow area between the center port and one of the side ports, while keeping the other side port blocked. During the uptravel of the platform, the valve spool is moved in a right hand direction as viewed in FIG. 14. This allows fluid from the accumulator tank to enter the control valve through the conduit 282 and exit from the housing 272 through the port 296. During the downtravel of the elevator platform, the valve is moved in a left hand direction. This connects the working chamber of the fluid motor to the exhaust region as communication is established between conduits 296 and 284. When the valve cylinder is moved to a central neutral position, all flow ceases and the elevator stops moving.

The valve assembly 14 is supported by a platform which in turn is supported, as seen in FIG. 14, by vertical supports 314 and cross members 316 and 318. The platform 312 is secured to a vertical wall 320, supported by the runner 216 and the cooperating web 222.

A pair of transverse plates 322 and 324 is positioned as shown on the platform 312. These plates support the valve assembly 14. They support also the left hand end of the cylinder 16 for the fluid motor. The right hand end of the cylinder 16 is supported by the pedestal 326 which can rest upon the deck which also supports the runner 216. The pedestal 326 includes brackets 328 which surround the cylinder 16.

In FIGS. 10, 11, 12, and 13 is illustrated more particularly the movable sheave assembly 12. This includes a rotary drum 330 which is adapted to rotate about an axis 332. The drum includes two sides, 334 and 336. The periphery of the drum is in the form of a cylinder 338, which is connected to the sides 334 and 336 by means of the rings 340 and 342, respectively. These rings are situated adjacent the inner peripheral surface of the sides 334 and 336, and are secured in place by bolts or rivets.

The periphery of side 334 forms a track-engaging rim 344 having a running surface 346. In a similar fashion, a track-engaging rim 348 is formed on the opposite side of the cylinder 338. It includes a runner surface 350. Each runner surface is adapted to engage one of a pair of parallel tracks, one of which is indicated at 234 in FIGS. 11 and 12.

Surrounding the drum 330 is a chassis having a side portion 352. A bearing ring 354 is disposed directly adjacent the side portion 352 and is secured to it. An outer roller bearing race 356 is connected to the support 354. The cooperating inner bearing race 358 is formed on the cylinder 338. Roller bearing elements 360 are situated between the races 356 and 358. A corresponding bearing 362 is formed on the opposite side of the cylinder 338. It includes an outer race 364 and an inner race 366 which is formed on the cylinder 338. Fluid seals are situated on the inboard sides of each of the roller bearing assemblies as shown at 368 and 370, respectively.

The roller bearing races 356 and 364 surround the cylinder 338. One side of each of them is connected to a separate side member 366 and 368, respectively. The side members 366 and 368 extend around the entire sheave assembly, as indicated best in FIG. 10. The side member 368 has a first cam member 370 secured thereto. Formed on this cam member is a cam surface 372 which is adapted to engage a cam follower 374 journaled on one leg of the bell crank lever element 254 of FIG. 11. The cam surface 372 engages the follower 374 when the elevator reaches its uppermost limiting position. This causes the valve to close as it is shifted in a left hand direction. The elevator then comes to a controlled stop as it engages the mechanical abutments at its uppermost position. The cam 370 is secured to the side member 368 by spacers 376 and 378.

The opposite end of the side member 368 also has secured thereto the second cam 246 which has formed thereon the cam surface 244. This cam 246 is secured to the side wall 368 by means of spacers 380 and 382.

The left hand end of the walls 368 and 366 are joined together by a cross member 384, thus forming a rigid chassis assembly.

As best seen in FIGS. 10 and 12, the cylinder 338 is formed with two axially spaced pairs of cable grooves 386 and 388. These are adapted to receive cables of the sheave assembly, as will be explained subsequently. A sheave ring 390 is concentrically disposed about the cylinder 338. It is formed with four axially spaced cable grooves 392 which receive in registering relationship four parallel cables, as will be explained subsequently. The center section of the cylinder 338 defines an inner bearing race 394 for a pair of axially spaced roller bearings 396 and 398. The inner surface of the ring 390 forms an outer bearing race for the bearing elements of bearings 394 and 398. Thus the ring 390 is journaled rotatably for independent rotation with respect to the cylinder 338.

Bearing seals 400 and 402 are disposed on each lateral side of the ring 390 by means of cooperating snap rings, the seals 400 and 402 also act as retainers for the ring 390 which prevent axial displacement thereof with respect to the cylinder 338. A bearing retainer ring 404 is held in place on the cylinder 338 by an anchor pin 406.

The right hand end of the side walls 366 and 368 has secured thereto a pair of reaction blocks 408 and 410. These are engaged by reaction members 412 and 414, which are joined together by a circular cross member 416. Piston rod 418 is formed with a shoulder 420 engaging an adaptor 422 which in turn is anchored to the periphery of the opening in the member 416.

The right hand end of the side members 366 and 368, as viewed in FIG. 10 is adapted to support an auxiliary track engaging wheel. The wheel is illustrated best in FIG. 11.

Wall 368 is formed with a bearing opening 424 within which is positioned a ball bearing assembly 426. This assembly supports one end of an axial shaft 428. Wall 366 is formed with a similar bearing opening and a bearing assembly for supporting the other end of the shaft 428.

A first track engaging wheel 430 is carried by the left hand end of the shaft 428. A corresponding wheel 432 is carried by the right hand end of the shaft 428. Each wheel 430 engages one of the rails.

Int FIG. 3, I have illustrated in schematic form a cabling arrangement for use with the sheaves. Each sheave assembly comprises two separate sheaves. The two outboard sheave grooves for the stationary sheave assembly in FIG. 6 work together in unison as a single sheave. In a similar fashion the two outboard sheave grooves of the movable sheave assembly of FIG. 10 act together in unison. The inboard cable ring 84 of FIG. 6 and the sheave ring 390 of FIG. 10 each function as separate sheaves. During operation, ring 84 rotates in a direction opposite to the direction of rotation of the drum 52. Similarly, during operation, the ring 390 rotates in a direction opposite to the direction of rotaton of the drum 338 for the movable sheave assembly.

Cables 434 and 434' register with the grooves of drum 338 and with the grooves of drum 52. One end of cable 434 is anchored to an anchor block 436, as shown in FIG. 3 and in FIG 24. This block, in turn, is anchored to the end plates 204 and 208. Cable 434 then extends longitudinally with respect to the axis of the assembly and registers with grooves 388. Cables 434 encircle the drum 338 and then extend toward the left hand side of the assembly. They register with grooves 82 of the drum 52. The direction of the cables 434 then again is reversed as they extend rearwardly until they register with a deflection pulley assembly 438, which is independently supported as seen in FIG. 3.

The cables 434' follow the same path as the cables 434. They engage grooves 386 of the drum 338 and then pass in a left hand direction over the drum 52. They register with the grooves 80 and then pass in a right hand direction until they pass over the idler pulley 438.

The cables then pass in a vertical direction and over idler pulleys 440. Cable 434' passes over another idler pulley 442 and the companion cable 434 passes over another idler pulley 444. The ends of the cables 434 and 434' are connected to the extremities of an aircraft carrier platform 446.

The cables that surround the sheave rings 390 and 90 are situated in two pairs. Each of the four centrally disposed cables is anchored on the cable anchor block 202 as indicated in FIG. 2. These cables are indicated in FIG. 3 by reference character 448. They extend from the anchor block 202 around the sheave ring 390 on the movable sheave assembly 12. They engage the grooves 392 and then extend in a left hand direction and around the drum 52. They register with the grooves in the ring 90 and then extend in a vertical direction. They pass over a deflecting pulley 450. One pair of the cables 434 then passes over another idler pulley 452. Then the pair of cables 434 passes over another idler pulley 454. The ends of these separate pairs then are attached at spaced locations to the aircraft carrier elevator 446.

When the movable sheave 12 moves away from the stationary sheave 10, the elevator will be raised. This occurs as the valve cylinders of FIG. 14 are moved in a right hand direction. Fluid pressure is then distributed to the left hand side of the piston of the fluid motor 16. The right hand side of the fluid motor 16 does not receive oil. Atmospheric pressure exists in the right hand end of the cylinder 16.

When the valve is shifted in the opposite direction, the working fluid on the left hand side of the piston is brought into communication with the exhaust region. The weight of the elevator then tends to return the movable sheave assembly 12 in a left hand direction. As it goes along the tracks, the wheels 430 and 432 stabilize the movable sheave assembly. During the return of the movable sheave assembly to the original lowered starting position, the rate of movement of the sheave is controlled by the flow control valve assembly which controls the rate of displacement of the fluid by the piston. When the piston rod and the traveling sheave assembly 12 are approximately two feet from the end of the stroke, the cam 246 contacts the deceleration control linkage including the cam follower 242. The control valve at both ends returns mechanically to a neutral position, bringing the piston to controlled stop. This sheave assembly which is indicated generally at 456 in FIG. 11 contacts the safety limit switch control 458 approximately 18" from the end of the piston stroke. This de-energizes a solenoid operated cylinder valve which locks the hydraulic motor 130. The locked hydraulic motor acts as a brake whenever the platform is at rest by locking the sun gear in a fixed position, thus holding the control valves in a fixed position.

During the portion of the cycle in which the elevator is raised, fluid under pressure is delivered to the left hand side of the piston. When the traveling sheave assembly 12 is approximately two feet from the end of the stroke, the cam 370 contacts a cam follower 374 on the deceleration control linkage. The control valve is pulled then in turn to the neutral position, bringing the piston to a controlled stop. Again the cam on the sheave assembly contacts a limit safety switch approximately 18″ from the end of the stroke. The limit safety switch energizes the pilot operated solenoid valve which locks the hydraulic motor. When the platform rests against the flight deck and the platform stops, it is held securely by fluid pressure maintained against the piston through the slightly opened control valve spool.

In FIG. 16, I have shown in cross-sectional form the construction of the cable deflecting pulley 438. It includes a fixed pedestal 460 and aligned openings 462 and 464 for a support shaft 466. A bearing sleeve 468 surrounds shaft 466. Mounted upon the sleeve 468 is a sheave hub 470. A pair of spaced roller bearing assemblies 472 and 474 is situated between the hub 470 and the sleeve 468.

A bearing retainer ring 476 is secured by bolts to the right hand side of the sleeve 468. A corresponding bearing retainer ring 478 is secured to the other side of the sleeve 468. A fluid seal 480 is situated within the right hand end of the hub 470 and is held axially fast by a snap ring. A corresponding seal 482 is positioned on the opposite end of the hub 470. The outer race of bearing 472 engages an internal shoulder in the hub 470 as does the outer race for the bearing 474. The inner races for the bearing 472 and 474 engage a spacer 484 surrounding the sleeve 468. The bearings 472 and 474 are held axially fast by the retainer rings 476 and 478.

A first circular diaphragm plate 487 surrounds the hub 470. It engages the outer surface of the hub 470 and an annular shoulder 486 formed on the hub 470. A corresponding diaphragm plate 488 surrounds the other end of the hub 470 and engages an annular shoulder 490. The outer peripheries of the diaphragm plates 487 and 488 are curved divergently with respect to each other as shown at 492 and 494, respectively. The outer margins of the peripheries 492 and 494 engage the inner cylindrical surface 496 of a grooved ring 498. The ring 498 has formed around it four cable grooves 500 for accommodating each of the two pairs of cables 434 and 434′.

An intermediate portion of each of the diaphragm plates 487 and 488 curve toward the center of the sheave assembly so that they are brought into close proximity with each other. These proximate portions are bolted together by a nut and bolt fastener 502.

The diaphragm plates 487 and 488 are assembled on the hub 470 in an unstretched condition. The ring 498 then is positioned about the peripheries 492 and 494. Then the bolts 502 are tightened thereby drawing toegther the diaphragm plates 486 and 488. This causes radial expansion of the peripheries 492 and 494, thereby securing the rim or the ring 498 in a fixed fashion so that it forms a part of an integral assembly. No complicated welding operation is required during this assembly operation.

The pedestal 460 can be secured to the hangar deck of the carrier and need not form a part of the sheave assembly.

While raising the elevator platform, the feedback mechanism shown in part by the numerals 130 and 106 establishes the uniform rate of movement; for example, three feet per second. This is done by causing the fluid motor 130 to rotate at a constant speed of 50 r.p.m. The speed reduction gear unit 128 reduces the speed of the output rotor of the fluid motor to the design speed of 10 r.p.m. Thus the sun gear 114 is driven at a constant speed of 10 r.p.m.

The ring gear 104 rotates at the same speed as the sheave drum 52. The carrier 110 of the planetary gear unit 106 is connected mechanically to the flow control valve, which in turn controls the rate of displacement from a re-delivery to the piston and cylinder assemblies 16. If the platform is moving at the designed rate of 3 feet per second, the speed of the carrier 110 will be zero. The displacement from the designed speed, however, will cause rotation of the carrier 110 in one direction or the other since the speed of the sun gear 114 remains constant. Any speed-up in the movement of the carrier will result in a correcting movement of the flow control valve to cause a reduction of the rate of flow through the valve. This, then, will result in a reduction in the speed to the designed speed. If the speed of the elevator should decrease for some reason, the compensation provided by the feed-back mechanism will be in the opposite sense.

Having described a preferred form of my invention, what I claim and desire to secure by a U.S. Letters Patent is:

1. A sheave assembly comprising a hydraulic cylinder and piston assembly having a movable piston defining in part a fluid pressure chamber, a first sheave adapted for rotation about a fixed axis, a second sheave adapted for rotation about an axis that is parallel to the axis of said first sheave, a mechanical connection between said piston and said second sheave whereby said second sheave may be adjusted toward and away from said first sheave and said piston is moved, flexible cables extending from an anchor point around said second sheave and hence around said first sheave to a driven portion of the mechanism, a fluid pressure source, a conduit structure interconnecting said pressure source and said working chamber, flow control valve means in said conduit structure and partly defining the same for controlling the rate of distribution of pressurized fluid to said chamber and for controlling the rate of displacement of said fluid from said pressure chamber, said flow control valve means having a movable valve element adapted to control fluid communication between said pressure source and said pressure chamber and having first and second operating positions on opposed sides of a neutral position, said valve element establishing communication between said source and said pressure chamber when it is advanced to said first position, said valve element establishing communication between said pressure chamber and exhaust region when it is advanced to said second position, a valve control linkage connected to said movable valve element, a feed-back control mechanism having a power input element and a power output element, means for powering said power input element at a constant speed, means for connecting said power output element to said valve linkage, and another element of said feed-back mechanism being connected mechanically to one of said sheaves, said power output element being sensitive to the differential in speed between said power input element and said one sheave whereby appropriate adjustments of said valve are obtained upon a deviation in the speed of said driven member from a predetermined designed speed.

2. The combination as set forth in claim 1 wherein said one sheave is said first sheave which is adapted to rotate about a fixed axis.

3. The combination set forth in claim 1 wherein said feed-back mechanism comprises a planetary gear unit having a ring gear, a sun gear and planet gears engaging said sun and ring gears, said ring gear being connected to said first sheave, said sun gear being driven by said constant speed power source, a carrier rotatably journaling said planet gears, said carrier being connected mechanically to said valve operating linkage whereby the position of said valve operating linkage is sensitive to the differential in speed between said sun gear and said ring gear.

4. The combination as set forth in claim 3 wherein said planetary gear unit is situated in and is surrounded by said first sheave.

5. A sheave assembly comprising a hydraulic cylinder and piston assembly having a movable piston defining, in part, a fluid pressure chamber, a first sheave adapted for rotation about a fixed axis, a second sheave adapted for rotation about an axis that is parallel to the axis of said first sheave, a mechanical connection between said piston and said second sheave whereby said second sheave may be adjusted toward and away from said first sheave and said piston is moved, flexible cables extending from an anchor point around said second sheave and hence around said first sheave to a driven portion of the mechanism, a fluid pressure source, conduit structure interconnecting said pressure source and said working chamber, flow control valve means in said conduit structure and partly defining the same for controlling the rate of distribution of pressurized fluid to said chamber and for controlling the rate of displacement of said fluid from said pressure chamber, said flow control valve means having a movable valve element adapted to control fluid communication between said pressure source and said pressure chamber and having first and second operating positions on opposed sides of a neutral position, said valve element establishing communication between said source and said pressure chamber when it is advanced to said first position, said valve element establishing communication between said pressure chamber and exhaust region when it is advanced to said second position, a valve control linkage connected to said movable valve element, a feed-back control mechanism having a power input element and a power output element, means for powering said power input element at a constant speed, means for connecting said power output element to said valve linkage, and another element of said feed-back mechanism being connected mechanically to one of said sheaves, said power output element being sensitive to the differential in speed between said power input element and said one sheave whereby appropriate adjustments of said valve are effected upon a deviation in the speed of said driven member from a predetermined designed speed, said first sheave comprising a first sheave drum adapted for rotation about a fixed axis and an auxiliary sheave ring surrounding said drum and journaled thereon at an intermediate location, said ring being capable of rotating independently with respect to said drum, and sheave grooves located in said ring and in said drum.

6. The combination as set forth in claim 1 wherein said one sheave is said first sheave which is adapted to rotate about a fixed axis, said first sheave comprising a first sheave drum mounted for rotation about a fixed axis and an auxiliary sheave ring surrounding said drum and journaled around an intermediate location, said ring being capable of rotating independently with respect to said drum, and sheave grooves located in said ring and in said drum.

7. The combination set forth in claim 1 wherein said feed-back mechanism comprises a planetary gear unit having a ring gear and a sun gear and planet gears engaging said sun and ring gears, said ring gear being connected to said first sheave, said sun gear being driven by said constant speed power source, a carrier rotatably mounting said planet gears, said carrier being connected mechanically to said valve operating linkage whereby the position of said valve operating linkage is sensitive to the differential in speed between said sun gear and said ring gear, said first sheave comprising a first sheave drum mounted for rotation about a fixed axis and an auxiliary sheave ring surrounding said drum and journaled around an intermediate location, said ring being capable of rotating independently with respect to said drum, and sheave grooves located in said ring and in said drum.

8. The combination as set forth in claim 3 wherein said planetary gear unit is situated in and surrounded by said first sheave, said first sheave comprising a first sheave drum mounted for rotation about a fixed axis and an auxiliary sheave ring surrounding said drum and journaled around an intermediate location, said ring being capable of rotating independently with respect to said drum, and sheave grooves located in said ring and in said drum.

9. A sheave assembly comprising a hydraulic cylinder and piston assembly, having a movable piston defining in part a fluid pressure chamber, a first sheave adapted for rotation about a fixed axis and a second sheave adapted for rotation about an axis that is parallel to the axis of said first sheave, a mechanical connection between said piston and said second sheave whereby said second sheave may be adjusted toward and away from said first sheave and said piston is moved, flexible cables extending from an anchor point around said second sheave and hence around said first sheave to a driven portion of the mechanism, a fluid pressure source, conduit structure interconnecting said pressure source and said working chamber flow control valve means in said conduit structure and partly defining the same for controlling the rate of distribution of pressurized fluid to said chamber and for controlling the rate of displacement of said fluid from said pressure chamber, said flow control valve means having a movable valve element adapted to interrupt fluid communication between said pressure source and said pressure chamber and having first and second operating positions on opposed sides of a neutral position, said valve element establishing communication between said source and said pressure chamber when it is advanced to said first position, said valve element establishing communication between said pressure chamber and exhaust region when it is advanced to said second position, a valve control linkage connected to said movable valve element, a feed-back control mechanism having a power input element and a power output element, means for powering said power input element at a constant speed, means for connecting said power output element to said valve linkage, and another element of said feed-back mechanism being connected mechanically to one of said sheaves, said power output element being sensitive to the differential in speeds between said power input element and said one sheave whereby appropriate adjustments of said valve are effected upon a deviation in the speed of said driven member from a predetermined designed speed, said first sheave comprising a first sheave drum mounted for rotation about a fixed axis and an auxiliary sheave ring surrounding said drum and journaled around an intermediate location, said ring being capable of rotating independently with respect to said drum, and sheave grooves located in said ring and in said drum, said drum having a bearing race situated on its periphery adjacent its axial end thereof, a separate roller bearing engaging each bearing race, and a third bearing located between said ring and said drum at a location intermediate said separate bearings for rotatably mounting said sheave ring with respect to said drum.

10. The combination as set forth in claim 1 wherein said one sheave is said first sheave which is adapted to rotate about a fixed axis, said first sheave comprising a first sheave drum mounted for rotation about a fixed axis and an auxiliary sheave ring surrounding said drum and journaled around an intermediate location, said ring being capable of rotating independently with respect to said drum, and sheave grooves located in said ring and in said drum, said drum having a bearing race situated on its peripheray adjacent its axial end thereof, a separate roller bearing engaging each bearing race, and a third bearing located between said ring and said drum at a location intermediate. said separate bearings for rotatably mounting said sheave ring with respect of said drum.

11. A compound sheave assembly comprising a rotary drum, cable grooves formed within said drum on the periphery thereof, a first bearing ring surrounding said drum near one axial end thereof, a second bearing ring surrounding said drum adjacent the other axial end thereof, a sheave ring surrounding said drum at a location intermediate each of the axial ends thereof, first and second bearings means rotatably journaling said sheave ring with respect to said drum, cable grooves formed in said drum at a location intermediate said first bearing and said sheave ring and intermediate said second bearing ring and said sheave ring, and other cable grooves formed in the periphery of said sheave ring.

12. A cable deflecting sheave comprising a sheave supporting shaft, a sheave wheel drum journaled upon said supporting shaft, a hub, a first diaphragm plate and a second diaphragm plate surrounding said hub and extending radially outwardly, said diaphragm plates being similar and arranged in a juxtaposed adjacent relationship, a sheave ring surrounding the peripheries of said diaphragm plates, and means for fastening together said diaphragm plates set in a location intermediate said hub and said peripheries whereby said peripheries engage said ring and said hub to form a unitary assembly.

13. A combination as set forth in claim 12 wherein said diaphragm plates are curved at an intermediate location toward each other and are curved in a re-entrant fashion away from each other at their peripheries, the outer margins of said peripheries engaging the inner margin of said ring with frictional contact as the intermediate portions of said plates are drawn together by said fastening means.

References Cited

UNITED STATES PATENTS 3,314,657　4/1967　Prud'homme _____ 254—189

FOREIGN PATENTS 2,491　7/1875　Great Britain.

EVON C. BLUNK, *Primary Examiner.*

H. C. HORNSBY, *Assistant Examiner.*